United States Patent
Shum

(10) Patent No.: US 11,837,893 B2
(45) Date of Patent: Dec. 5, 2023

(54) ON-BOARD DIAGNOSTIC PORT SYNCHRONIZED BATTERY CHARGING SYSTEM

(71) Applicant: Vector Products, Inc., Boca Raton, FL (US)

(72) Inventor: Ling To Shum, Boca Raton, FL (US)

(73) Assignee: Vector Products, Inc., Boca Raton, FL (US)

( * ) Notice: Subject to any disclaimer, the term of this patent is extended or adjusted under 35 U.S.C. 154(b) by 165 days.

(21) Appl. No.: 17/395,512

(22) Filed: Aug. 6, 2021

(65) Prior Publication Data

US 2022/0085631 A1 Mar. 17, 2022

Related U.S. Application Data

(60) Provisional application No. 63/085,811, filed on Sep. 30, 2020, provisional application No. 63/077,936, filed on Sep. 14, 2020.

(51) Int. Cl.
*H02J 7/00* (2006.01)
*H02J 7/34* (2006.01)

(52) U.S. Cl.
CPC ........ *H02J 7/00306* (2020.01); *H02J 7/0013* (2013.01); *H02J 7/0042* (2013.01); *H02J 7/0047* (2013.01); *H02J 7/0063* (2013.01); *H02J 7/007182* (2020.01); *H02J 7/007194* (2020.01); *H02J 7/342* (2020.01)

(58) Field of Classification Search
CPC ..................................................... H02J 7/342
See application file for complete search history.

(56) References Cited

U.S. PATENT DOCUMENTS

| 8,421,400 B1* | 4/2013 | Khanna ..................... H02J 7/00 320/101 |
| 2005/0077878 A1* | 4/2005 | Carrier ................ H01M 50/583 320/134 |
| 2010/0013432 A1* | 1/2010 | Toya .................. H02J 7/007182 320/108 |
| 2012/0187897 A1* | 7/2012 | Lenk .................... H02J 7/00308 320/101 |

(Continued)

OTHER PUBLICATIONS

Amazon OBDII to Battery clip adapter, 2018.*

(Continued)

*Primary Examiner* — Drew A Dunn
*Assistant Examiner* — Tynese V McDaniel
(74) *Attorney, Agent, or Firm* — Sunstein LLP

(57) ABSTRACT

A charging system includes: an interface configured to removably and electrically couple to an external battery; a connector configured to removably and electrically couple to an on-board diagnostic (OBD) port of a vehicle; charge management circuitry electrically coupled to the interface and the connector; and a microcontroller unit (MCU) coupled to the charge management circuitry. The MCU is configured to execute computer readable program code for managing an output of current from the external battery to a vehicle battery of the vehicle through the electrical coupling of the connector and the OBD port. The charging system can be used to prevent a vehicle battery from becoming discharged during extended periods of storage.

14 Claims, 13 Drawing Sheets

(56) References Cited

U.S. PATENT DOCUMENTS

2016/0001719 A1* 1/2016 Frost .................. B60R 16/033
　　　　　　　　　　　　　　　　　　　　　　　307/20

OTHER PUBLICATIONS

Amazon OBDII to cigarette lighter adapter 2018.*
Anonymous: "POWOXI-Upgraded-20W-Solar-Battery-Charger-Maintainer, External Smart 3-Stages PWM Charge Controller, 12V Solar Panel TrickleCharging Kit for Car, Marine, Motorcycle, RV, etc : Amazon.co.uk: Business, Industry & Science", Jul. 13, 2019 (Jul. 13, 2019). URL:https://www.amazon.co.uk/dp/B07TY3HGF7/ref=psdc 4370161031 tl B07TWZDHFN. [retrieved on Nov. 2, 2021].
Anonymous: 11 Trickle charging through OBD2 port: Discovery Sport Forum 11, Feb. 6, 2020 (Feb. 6, 2020). URL: https://www.discosportforums.co.uk/threads/ [retrieved on Nov. 17, 2021].

* cited by examiner

| PIN | DESCRIPTION |
|---|---|
| 1 | Vendor Option |
| 2 | J1850 Bus + |
| 3 | Vendor Option |
| 4 | Chassis Ground |
| 5 | Signal Ground |
| 6 | CAN (J-2234) High |
| 7 | ISO 9141-2 K-Line |
| 8 | Vendor Option |
| 9 | Vendor Option |
| 10 | J1850 BUS |
| 11 | Vendor Option |
| 12 | Vendor Option |
| 13 | Vendor Option |
| 14 | CAN (J-2234) Low |
| 15 | ISO 9141-2 Low |
| 16 | Battery Power |

| MCU PIN | DESCRIPTION |
|---|---|
| 1 | Measure external battery temperature |
| 2 | Measure voltage of vehicle battery |
| 3 | NC |
| 4 | Enable to measure external battery temperature |
| 5 | GND |
| 6 | LED output pin |
| 7 | Enable buck circuit |
| 8 | Output switch |
| 9 | Enable to measure vehicle battery voltage |
| 10 | VDD |
| 11 | Crystals |
| 12 | Crystals |
| 13 | Measure voltage of section 1-5 cells |
| 14 | Measure voltage of section 1-3 battery |

FIG. 7

ON-BOARD DIAGNOSTIC PORT SYNCHRONIZED BATTERY CHARGING SYSTEM

BACKGROUND OF THE INVENTION

Field of the Disclosure

The disclosure relates generally to the field of chargers for motor vehicle batteries.

Background

In the automotive industry, a memory saver is a device that can be connected to the on-board diagnostic ("OBD") port inside an automobile to save the computer's memory while changing the vehicle battery during maintenance. Starting batteries are well known in the industry as they provide starting capabilities to combustion and electrical engines and motors. At times, due to environmental conditions, age of the starting batteries or other unexpected scenarios, the starting battery loses its energy and is unable to deliver the energy required to provide starting capabilities to combustion and electrical engines and motors. Because of this unexpected starting battery deficiency condition, the need of a temporary alternative energy source is always necessary. It is to address the above problems with starting batteries that the below disclosed novel system/device and method are directed.

BRIEF SUMMARY OF THE INVENTION

Disclosed herein is a charging system and a corresponding charging method as specified in the independent claims. Embodiments of the present invention are given in the dependent claims. Embodiments of the present invention can be freely combined with each other if they are not mutually exclusive.

According to one embodiment of the present invention, a charging system includes: an interface configured to removably and electrically couple to an external battery; a connector configured to removably and electrically couple to an on-board diagnostic (OBD) port of a vehicle; charge management circuitry electrically coupled to the interface and the connector; and a microcontroller unit (MCU) coupled to the charge management circuitry. The MCU is configured to execute computer readable program code for managing an output of current from the external battery to a vehicle battery of the vehicle through the electrical coupling of the connector and the OBD port.

According to another embodiment of the present invention, in a charging method, a microcontroller unit (MCU) of a charging system outputs a current from an external battery to a connector of the charging system. The external battery is removably and electrically coupled to the charging system, and the connector is removably and electrically coupled to an on-board diagnostic (OBD) port of a vehicle, where the connector is electrically coupled to a vehicle battery of the vehicle through the OBD port. During the outputting of the current, the MCU measures a voltage of the vehicle battery using the electrical coupling of the connector and the OBD port. Upon determining that the voltage of the vehicle battery has reached a set voltage, the MCU stops the output of the current and enters a low power consumption mode for a predetermined period of time. Upon the expiration of the predetermined period of time, the MCU measures the voltage of the vehicle battery using the electrical coupling of the connector and the OBD port. If the voltage of the vehicle battery is above a charge voltage, the MCU reenters the low power consumption mode for the predetermined period of time and repeats the measuring of the voltage of the vehicle battery. If the voltage of the vehicle battery is below the charge voltage, the MCU repeats the charging method.

BRIEF DESCRIPTION OF THE SEVERAL VIEWS OF THE FIGURES

FIG. 7 is a diagram of pin assignments for the MCU in an exemplary embodiment.

DETAILED DESCRIPTION OF THE INVENTION

Figure 1:
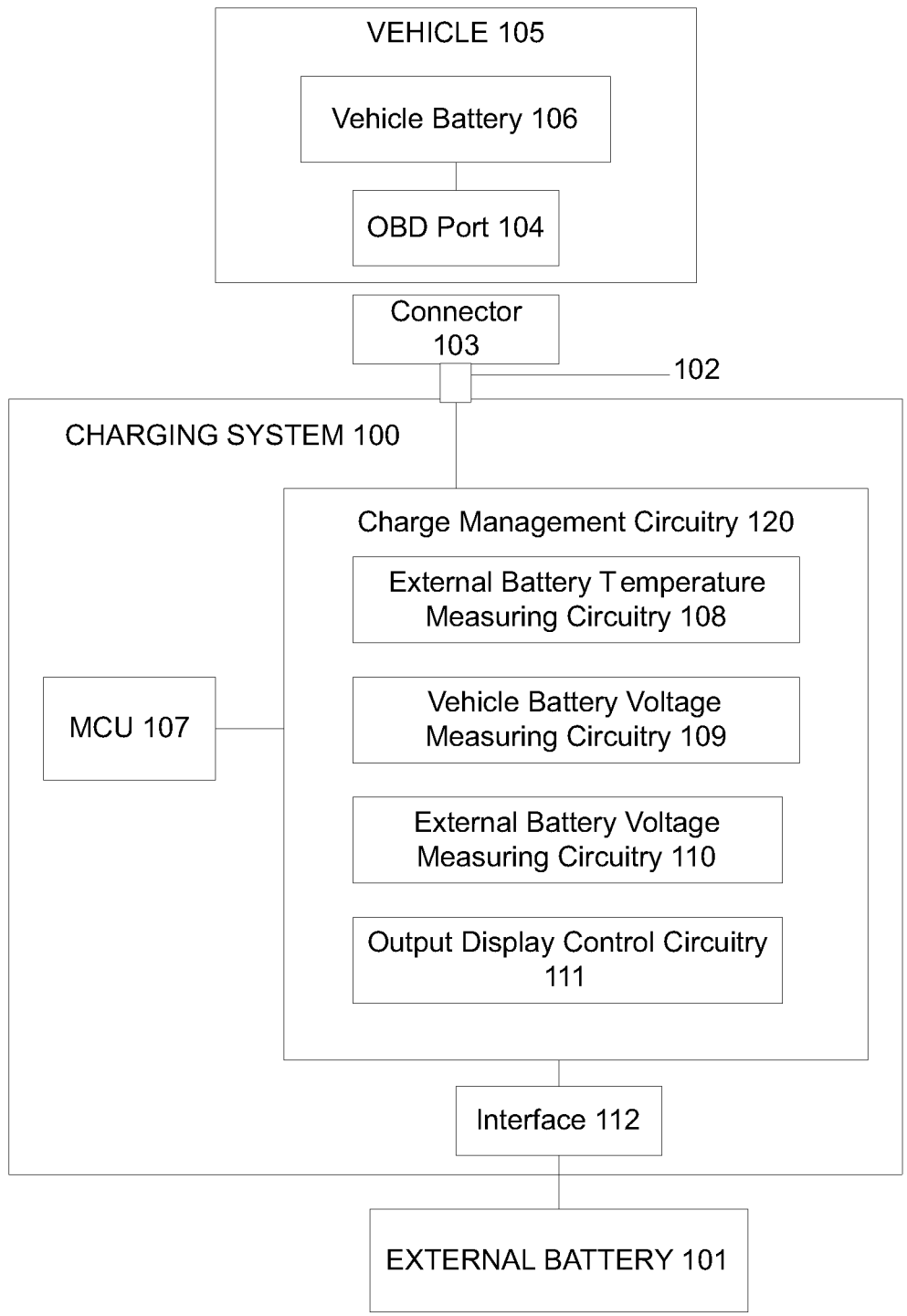
FIG. 1 illustrates a block diagram of a charging system according to an exemplary embodiment.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Embodiments of a charging system is disclosed herein, that can be used to prevent a vehicle battery from becoming discharged during extended periods of storage, vehicle inactivity due to long vacation trips, winter storage, etc. The charging system is connected to the OBD port of the vehicle during use and preferably uses an external battery for charging purposes, though other batteries or battery packs can also be used and are considered within the scope of the present invention. Embodiments of the charging system can provide a burst of charging current using and/or through the OBD port. Accordingly, using the charging system helps to prevent or reduce the chance that a vehicle battery becomes discharged during extended storage, without the need of connecting a charger to the vehicle battery that is powered by a main building power source. Use of the charging system also eliminates the need to connect the charging system directly to the vehicle battery's terminals/posts.

Embodiments of the charging system and method combines two electrical systems (e.g., tool lithium battery and lead acid automotive battery) to supplement flexibility and integration performance and usefulness to the user. In preferred embodiments, the charging system and method integrates a self-powered management system that monitors the energy level of the main system battery (i.e., the vehicle battery) and by the same, replenish the lost energy by drawing from the detachable external battery electrically coupled to the charging system. Embodiments of the charging system and method can compensate for the self-discharge characteristic of a vehicle battery by monitoring and charging the vehicle battery as needed, providing a non-limiting advantage for vehicles left in storage for extended periods of time, such as during the winter season, while traveling, while parked in the parking garage, etc. Another non-limiting advantage is that vehicles with inaccessible batteries can be recharged without connecting directly to the vehicle battery's posts/terminals by alternatively using the vehicle's OBD port. Thus, embodiments of the charging system and method provide the following non-limiting functions/benefits:

Saves time and money for the user by keeping the vehicle battery charged during long periods in storage and other scenarios.

Automatically, without user intervention, monitors the vehicle battery for self-discharge and activates the charging of the vehicle battery, as necessary.

Restores lost energy for vehicle starting batteries.

Reduces and/or prevents deep vehicle battery discharges.

No extension cord or AC outlet plug-in required, as the charging system is preferably cordless with respect to its power source.

Preferably works with a tool battery, though other batteries can also be used and are considered within the scope of the invention.

Accordingly, embodiments of the charging system and method can prolong or extend the life of a vehicle battery, by not allowing the vehicle battery to enter a sulfation stage when the vehicle battery remains in a discharged state for prolong periods of time. Embodiments of the charging system provides for a synchronized charger and aids and assists in keeping the vehicle battery at a good health level during extended periods of storage and preferably prevents the vehicle battery from deep discharge. In a preferred embodiment, the use of an external battery, e.g., a lithium tool battery, is expanded into the automotive or motor vehicle industry, as it is can be used to synchronize the charging of a vehicle battery using the OBD port to extend the life of the vehicle battery.

FIG. 1 illustrates a block diagram of a charging system according to an exemplary embodiment. The charging system 100 removably and electrically couples to an external battery 101 through an interface 112. The charging system 100 includes a cord 102 coupled to a connector 103 at one end for removably and electrically coupling with an OBD end 104 of a vehicle 105 in order to provide charge to the vehicle battery 106. The charging system 100 includes a microcontroller unit (MCU) 107 for controlling charge management circuitry 120 in the implementation of the charging method according to embodiments of the present invention. In a preferred embodiment, the charge management circuitry 120 includes, but is not limited to, the external battery temperature measuring circuitry 108 to measure the temperature of the external battery 101, the vehicle battery voltage measuring circuitry 109 to measure the voltage of the vehicle battery 106, and the external battery voltage measuring circuitry 110 to measure the voltage of the external battery 101. The charging system 100 further includes an output display control circuitry 111 used by the MCU 107 to control an output display (e.g., an LED display, not shown) for providing visual information to the user. The charging system and the charging method are described in more detail below.

Figure 2:
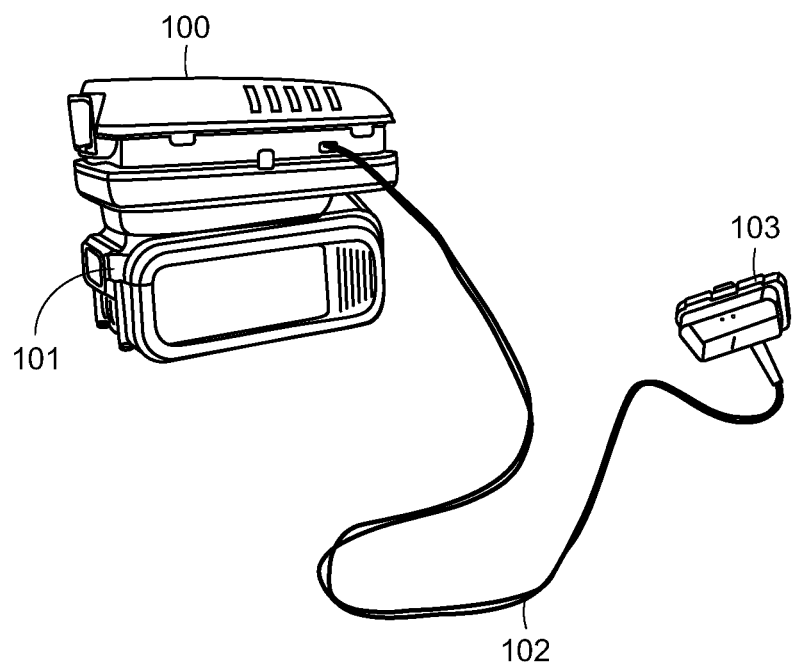
FIG. 2 illustrates an exemplary charging system and external battery according to the present invention.
Figure 3A:
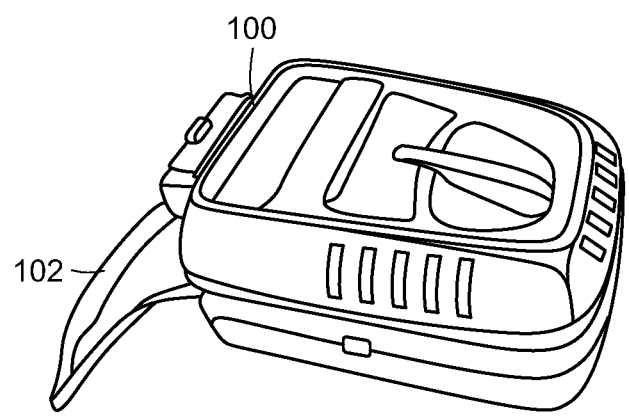
FIGS. 3A and 3B illustrate close up views of the top side of the enclosure of the charging system without the external battery.
Figure 3B:
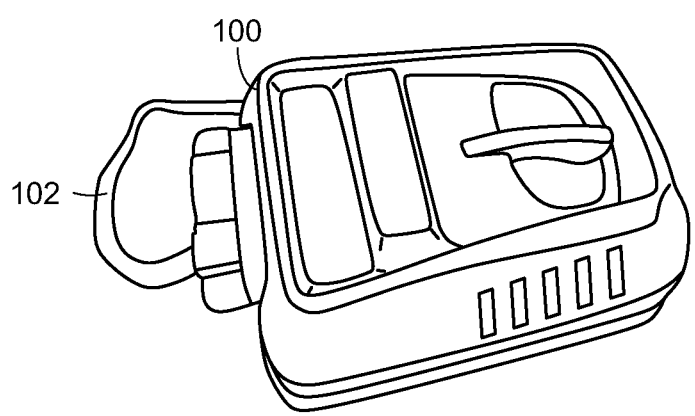
Figure 3C:
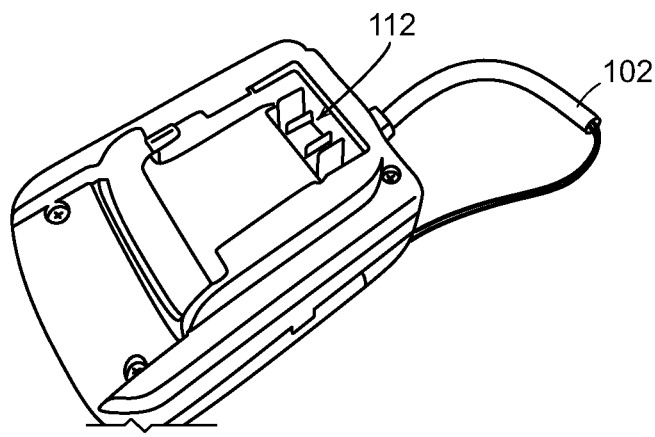
FIG. 3C illustrates a close up view of the bottom side of the charging system without the external battery.

FIG. 2 illustrates an exemplary charging system and external battery according to the present invention. In a preferred embodiment, the charging system 100 includes an enclosure, preferably lightweight, plastic, and compact in design that can fit in the palm of a hand, and preferably weighting under one pound. The charging system 100 is removably and electrically coupled to an external battery 101. The charging system 100 further includes the cord 102 and the connector 103. FIGS. 3A and 3B illustrate close up views of the top side of the enclosure of the charging system 100 without the external battery 101. FIG. 3C illustrates a close up view of the bottom side of the charging system 100 without the external battery 101. The bottom side of the charging system 100 includes the interface 112 for electrically connecting the external battery 101 (not shown in FIG. 3C) to the charging system 100. When the external battery 101 is electrically coupled to the charging system 100, the charging system 100 can be placed on the floor carpet of the vehicle 105, as the cord 102 of the charging system 100 can be preferably over twenty inches in length for a direct connection. Such dimensions are not considered limiting and smaller or larger dimensions for the cord 102 length of the charging system 100 can be used and are also considered within the scope of the present invention.

Figure 4:
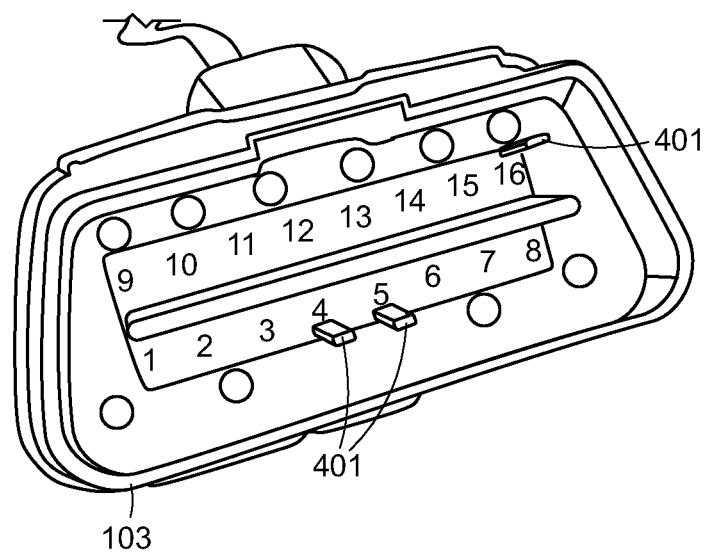
FIG. 4 illustrates a close up view of the connector at an outer end of the cord for connecting to the OBD port.
Figure 5:
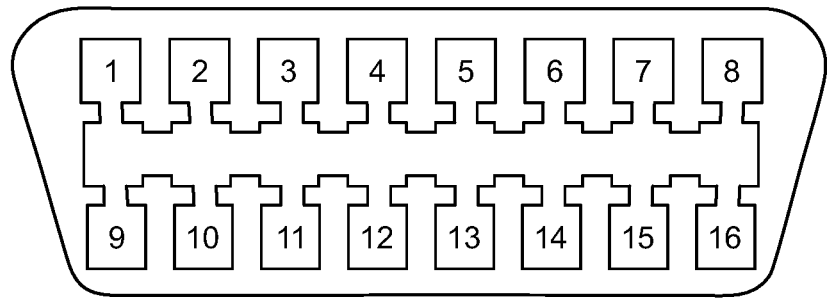
FIG. 5 is a diagram of pin assignments according to the OBD-II standard.

FIG. 4 illustrates a close up view of the connector 103 at an outer end of the cord 102 for connecting to the OBD port 104. The OBD port 104 conventionally includes 16 pins. FIG. 5 is a diagram of pin assignments according to the OBD-II standard. As illustrated in FIG. 4, in a preferred embodiment, the connector 103 includes three pins 401, corresponding to pins 4 (Chassis Ground), 5 (Signal Ground), and 16 (Battery Power) of the OBD-II standard OBD port 104. Other pins or pin combinations can be used and are also considered within the scope of the present invention.

Figure 6:
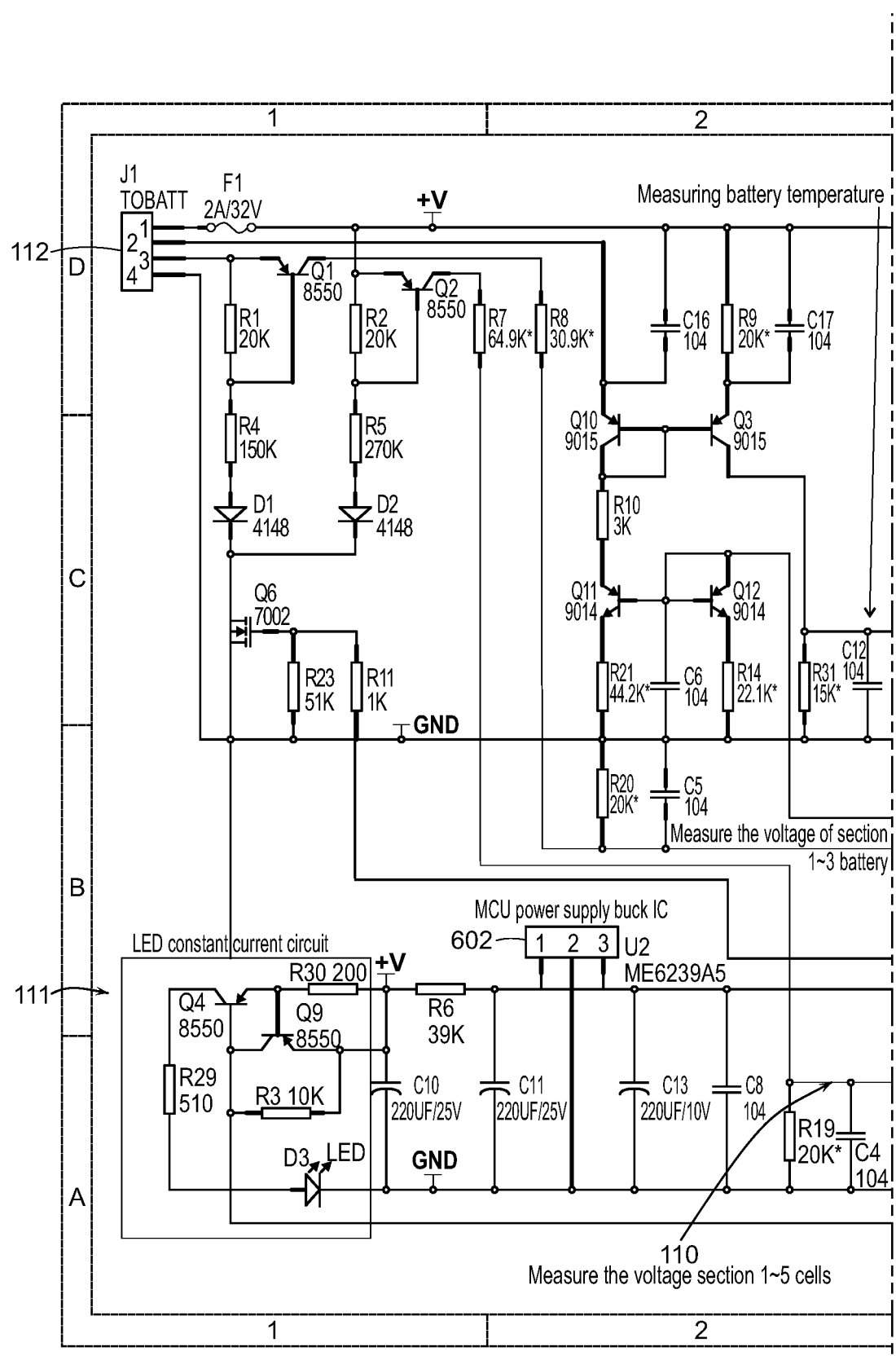
FIG. 6 illustrates a diagram of an exemplary charge management circuitry of the charging system.
Figure 6:
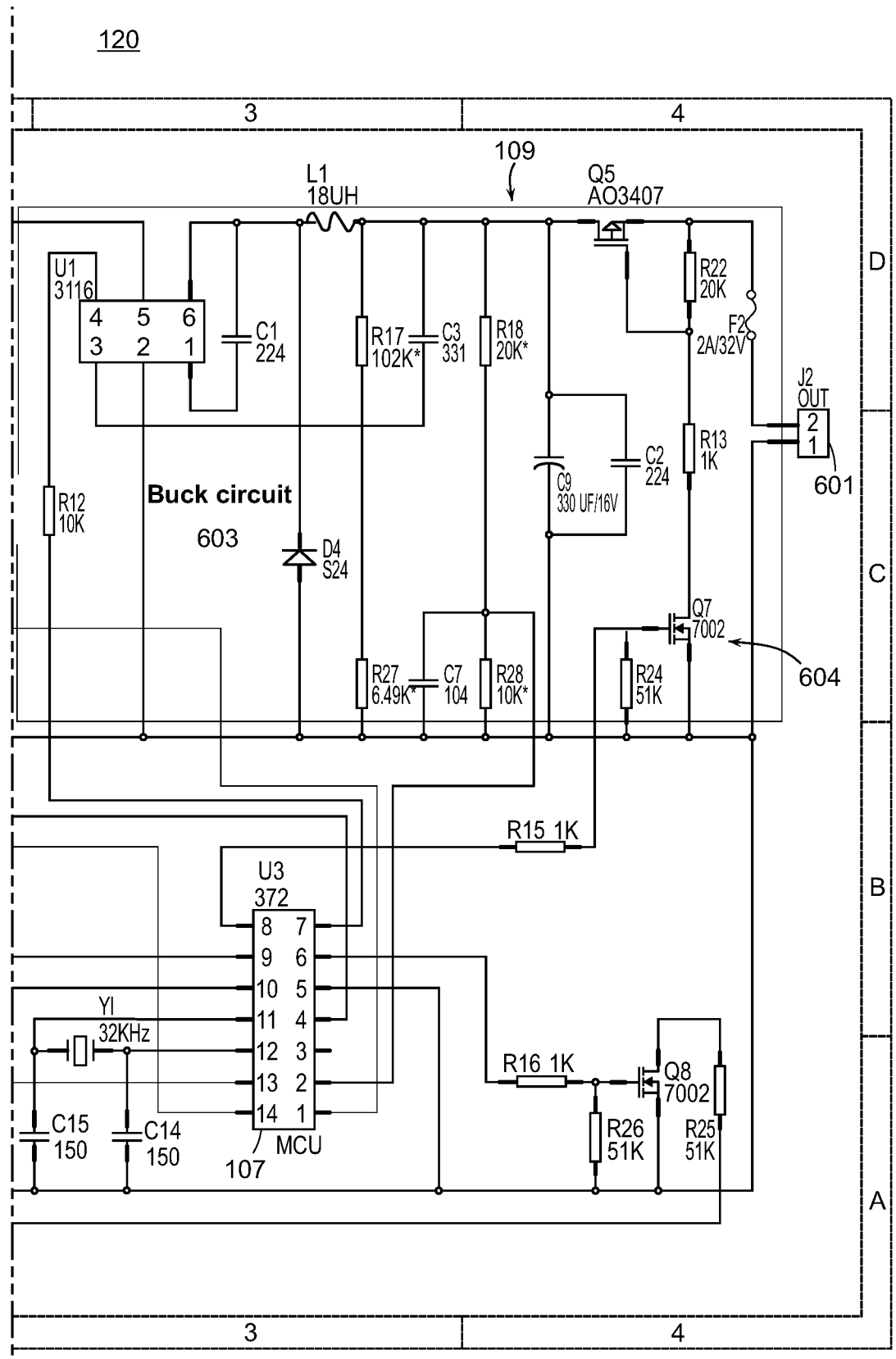

FIG. 6 illustrates a diagram of an exemplary charge management circuitry 120 of the charging system 100. The charge management circuitry 120 includes the interface 112 (see also FIG. 3C) for electrically coupling the charging system 100 and the external battery 101, and an interface 601 for electrically coupling the charging system 100 to the OBD port 104 via the connector 103. The charge management circuitry 120 is controlled by the MCU 107, which has its own power supply 602. In this exemplary embodiment, the MCU 107 includes 14 pins. FIG. 7 is a diagram of pin assignments for the MCU 102 in this exemplary embodiment.

- Pin 1 couples to the external battery temperature measuring circuitry 108 for measuring the temperature of the external battery 101.
- Pin 2 couples to the vehicle battery voltage measuring circuitry 109 for measuring the voltage of the vehicle battery 106 via the electrical connection between the connector 103 and the OBD port 104.
- Pin 3 has no connection in this exemplary embodiment.
- Pin 4 is used by the MCU 107 to transmit signals to enable the temperature measurement of the external battery 101.
- Pin 5 is coupled to electrical ground.
- Pin 6 is used by the MCU 107 to transmit signals to the output display control circuitry 110, such as to control LEDs of the output display.
- Pin 7 is used by the MCU 107 to transmit signals to enable the buck circuit 603. As known in the art, a buck circuit is a DC-to-DC power converter which steps down voltage from supply (external battery 101) to load (vehicle battery 106).
- Pin 8 couples to an output switch 604 between the charging system 100 and the OBD port 104.
- Pin 9 is used by the MCU 107 to transmit signals to enable the measurement of the voltage of the external battery 101.
- Pin 10 couples to the MCU 107 to its power supply 602.
- Pins 11 and 12 couples to oscillators.
- Pins 13 and 14 couples to the external battery voltage measuring circuitry 110, used by the MCU 107 to measure the voltage of sections of the external battery 101. In this exemplary embodiment, the external battery 101 includes multiple cells, and each cell or sections of cells may be separately monitored for balancing purposes.

Figure 8:
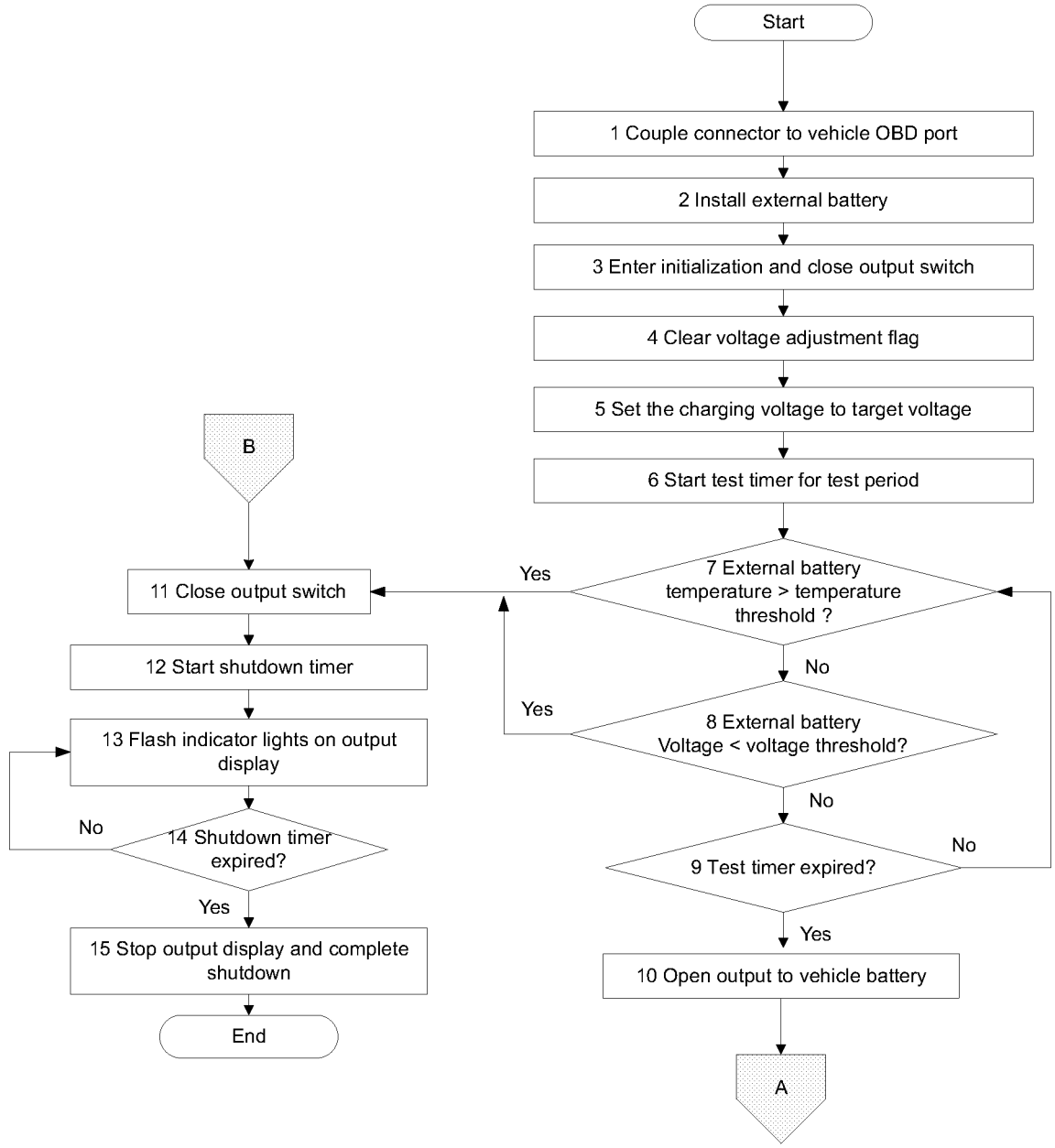
FIG. 8 illustrates an initialization process of the charging method according to an exemplary embodiment.

FIG. 8 illustrates an initialization process of the charging method according to an exemplary embodiment. First, the user couples the connector 103 to the vehicle OBD port 104 (block 1) and installs the external battery 101 by coupling the external battery 101 to the interface 112 on the bottom side of the charging system 100 (block 2). The MCU 107 of the charging system 100 then enters into the initialization process by first closing the output switch to the OBD port 104, such that no charge is provided through this port 104 (block 3). The MCU 107 clears the voltage adjustment flag (block 4). The voltage adjustment flag is used by the MCU 107 to track the number of awakenings from a sleep mode, as explained below with reference to FIG. 9. The clearing of the voltage adjustment flag allows for a more precise measurement of the vehicle battery 106 by setting a new starting point after each system startup. The MCU 107 sets the charging voltage to a target voltage (e.g., 12.5 V) (block 5). In a preferred embodiment, the target voltage is set at an optimum voltage according to the specification of the manufacturer of the external battery 101. The MCU 107 then starts a test timer for a predetermined test period (e.g., 1 minutes) (block 6).

During the test period, the MCU 107 continuously and/or periodically measures the temperature of the external battery 101 (block 7) and the voltage of the external battery 101 (block 8). If the temperature of the external battery 101 exceeds a threshold temperature or range of temperatures (e.g., 20° C.-60° C.), then the MCU 107 determines that the external battery 101 is too hot (block 7). If the voltage of the external battery 101 drops below a voltage threshold or range of voltages (e.g., 12.5 V+/−0.3 V), then the MCU 107 determines that the external battery 101 is fully discharged, i.e., under voltage (block 8). In a preferred embodiment, the temperature threshold and/or the voltage threshold are set according to the specification of the manufacturer of the external battery 101.

If the external battery 101 exceeds the temperature threshold or drops below the voltage threshold at any time during the testing period, then the MCU 107 ends the initialization process and, if the output switch has not yet been closed, closes the output switch to the OBD port 104 (block 11). The MCU 107 then performs a shutdown process. In the shutdown process, the MCU 107 starts a shutdown timer (block 12), e.g., 60-seconds, to a period of time for the MCU 107 to communicate to the user that an error occurred during the initialization process. The MCU 107 does so by causing the output display to indicate the error, such as rapidly flashing LEDs on the output display (block 13). Once the shutdown timer expires (block 14), the MCU 107 stops the output display and completes the shutdown of the charging system 100 by powering off the MCU 107 in order to prevent the external battery 101 from over discharging (block 15).

If the testing period expires without the external battery 101 exceeding the temperature threshold or dropping below the voltage threshold (block 9), then the MCU 107 opens the output switch to the OBD port 104 and begins the charging process, as described below with reference to FIG. 9.

Figure 9:
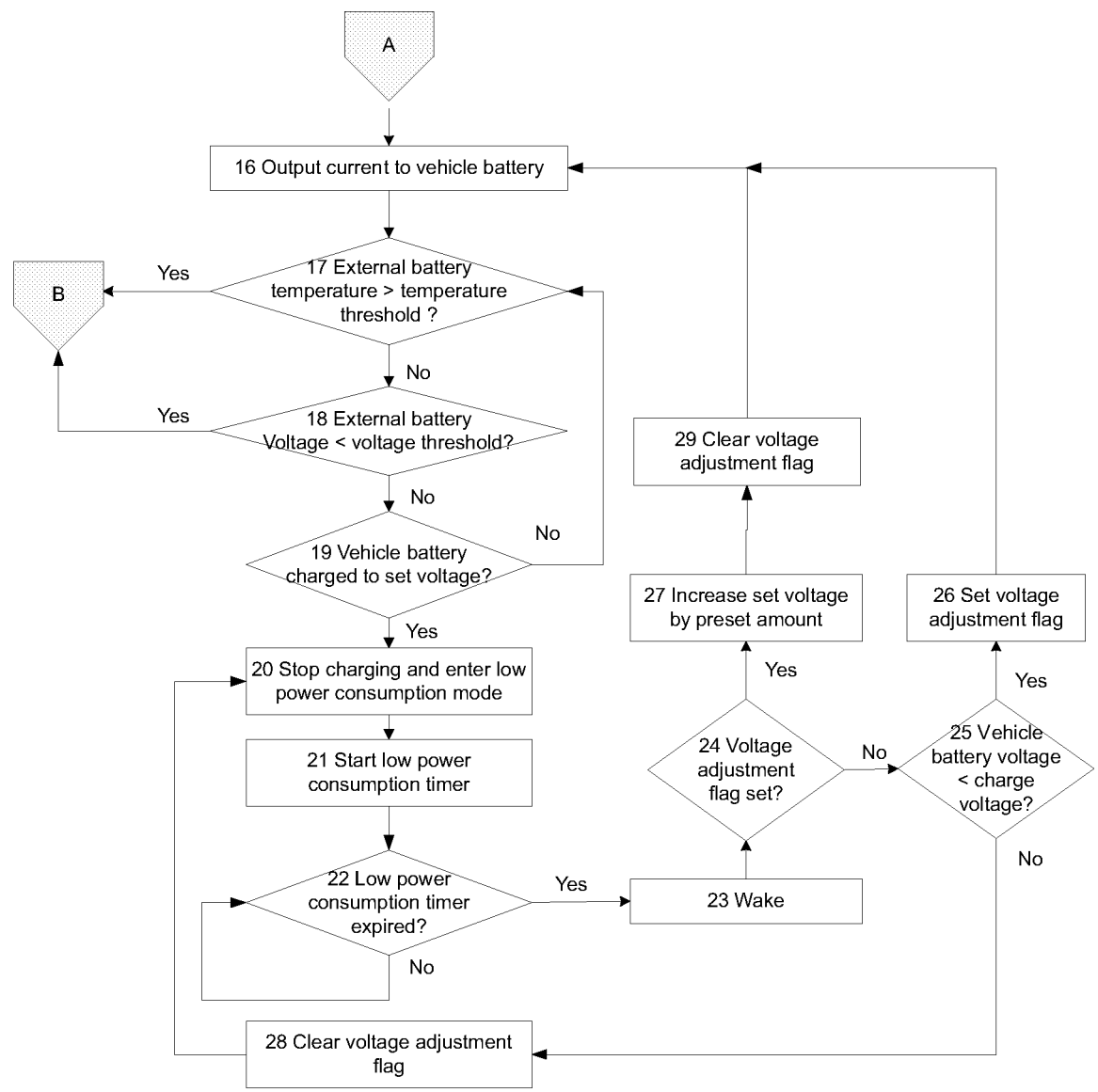
FIG. 9 illustrates a charging process of the charging method according to an exemplary embodiment.

FIG. 9 illustrates a charging process of the charging method according to an exemplary embodiment. After opening the output switch (per block 10 in FIG. 8), the charging system 100 begins to output current from the external battery 101 to the vehicle battery 106 via the electrical connection between the connector 103 and the OBD port 104 (block 16). The charging system 100 continues to output current until the MCU 107 determines that the vehicle battery 106 is charged to a set voltage (block 19). During the charging process, the MCU 107 continuously or periodically measures the temperature of the external battery 101 (block 17) and the voltage of the external battery 101 (block 18) in manners similar to blocks 7 and 8 of FIG. 8. If the external battery 101 exceeds the temperature threshold or drops below the voltage threshold during the charging process, then the MCU 107 ends the charging process by closing the output switch to the OBD port 104 (block 11, FIG. 8). The MCU 107 then shuts down per blocks 12-18 of FIG. 8.

Once the vehicle battery 106 is charged to the set voltage (block 19), the MCU 107 stops the charging of the vehicle battery 106 by closing the output switch and entering a low power consumption mode or "sleep mode" (block 20). In this exemplary embodiment, the power level in the low power consumption mode is set according to the specification of the manufacturer of the external battery 101 (e.g., 27 μA). The MCU 107 then starts a low power consumption timer (e.g., a 5-hour timer) (block 21). At the expiration of the low power consumption timer (block 22), the MCU 107 exits the low power consumption mode (block 23), or "wakes", and determines whether the voltage adjustment flag is set (block 24). A voltage adjustment flag that is not set indicates that the current awakening from the low power consumption mode is a first to two awakenings. A set voltage adjustment flag indicates that the current awakening is the second of two awakenings. When the voltage adjustment flag is not set, the MCU 107 measures the voltage of the vehicle battery 106 using the electrical coupling between the connector 103 and the OBD port 104 (block 25). If the voltage of the vehicle battery 106 is not below a preset charge voltage (e.g., 12.5 V), then the vehicle battery 106 does not require recharging at this time. Optionally, the MCU 107 clears the voltage adjustment flag (block 28) to ensure that the flag is cleared. The MCU 107 then repeats the sleep mode (blocks 20-22). If the voltage of the vehicle battery 106 is below the charging voltage (block 25), then the vehicle battery 106 requires recharging. The MCU 107 sets the voltage adjustment flag (block 26) and outputs current to charge the vehicle battery 106 (blocks 16-19).

If the MCU 107 determines that the voltage adjustment flag is set (block 24), i.e., the current awakening is the second of two awakenings, then the MCU 107 increases the set voltage by a preset amount (e.g., 200 mV) (block 27). The MCU 107 clears the voltage adjustment flag (block 29) and then proceeds with the charging of the vehicle battery 106 to the increased set voltage (blocks 16-19). Thus, for every two awakenings, the vehicle battery 106 is charged to the increased set voltage regardless of the voltage of the vehicle battery. In this manner, the vehicle battery 106 from becoming discharged by keeping the battery at the preset charge voltage.

Referring to FIGS. 7-9, during the initialization and charging processes in this exemplary embodiment, the MCU 107 sends a signal to enable the temperature measurement using pin 4 and then measures the temperature of the external battery 101 using pin 1. The MCU 107 sends a signal to enable the voltage measurement using pin 9 and measures the voltage of the external battery 101 using pins 13 and 14. The MCU 107 measures the voltage of the vehicle battery 106 using pin 2. The MCU 107 also sends a signal using pin 8 to open and close the output switch to the OBD port 104, enables the buck circuit by sending a signal using pin 7, and controls the output display 110 by sending signals using pin 6.

Figure 10:
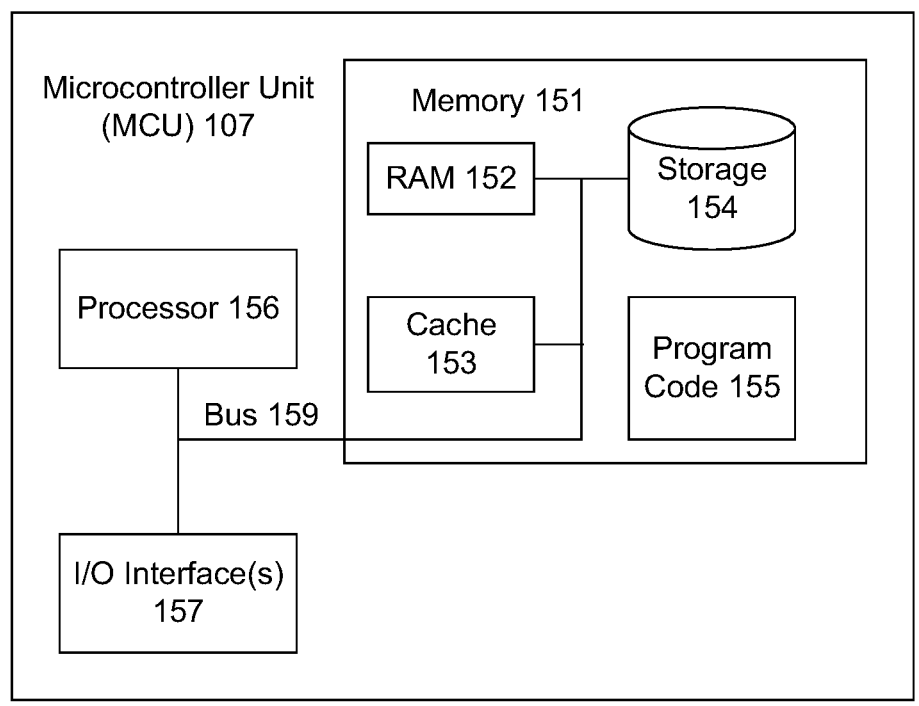
FIG. 10 illustrates a microcontroller according to exemplary embodiments.

FIG. 10 illustrates a microcontroller according to exemplary embodiments. The microcontroller 150 is operationally coupled to a processor or processing units 156, a memory 151, and a bus 159 that couples various components, including the memory 151 to the processor 156. The bus 159 represents one or more of any of several types of bus structure, including a memory bus or memory controller, a peripheral bus, an accelerated graphics port, and a processor or local bus using any of a variety of bus architectures. The memory 151 may include computer readable media in the form of volatile memory, such as random access memory (RAM) 152 or cache memory 153, or non-volatile storage media 154. The memory 151 may include a set of at least one program code module 155 that are configured to carry out the functions of embodiment of the present invention when executed by the processor 156. The microcontroller 150 may also communicate with other components via input/output (I/O) interfaces 157, e.g., pins as illustrated in FIG. 7.

Figure 11:
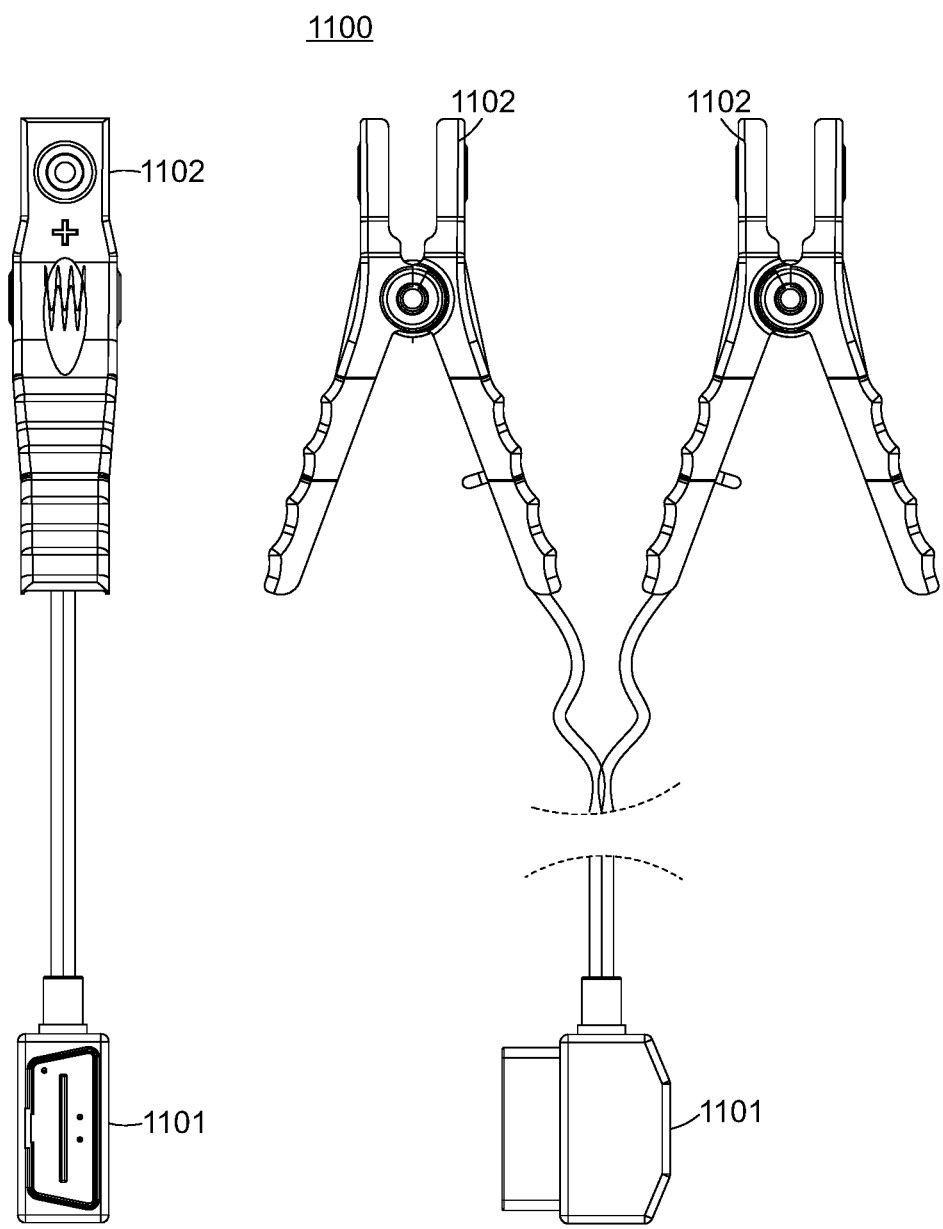
FIGS. 11 and 12 illustrate further exemplary embodiments, where the connector of the charging system is coupled to a cable.
Figure 12:
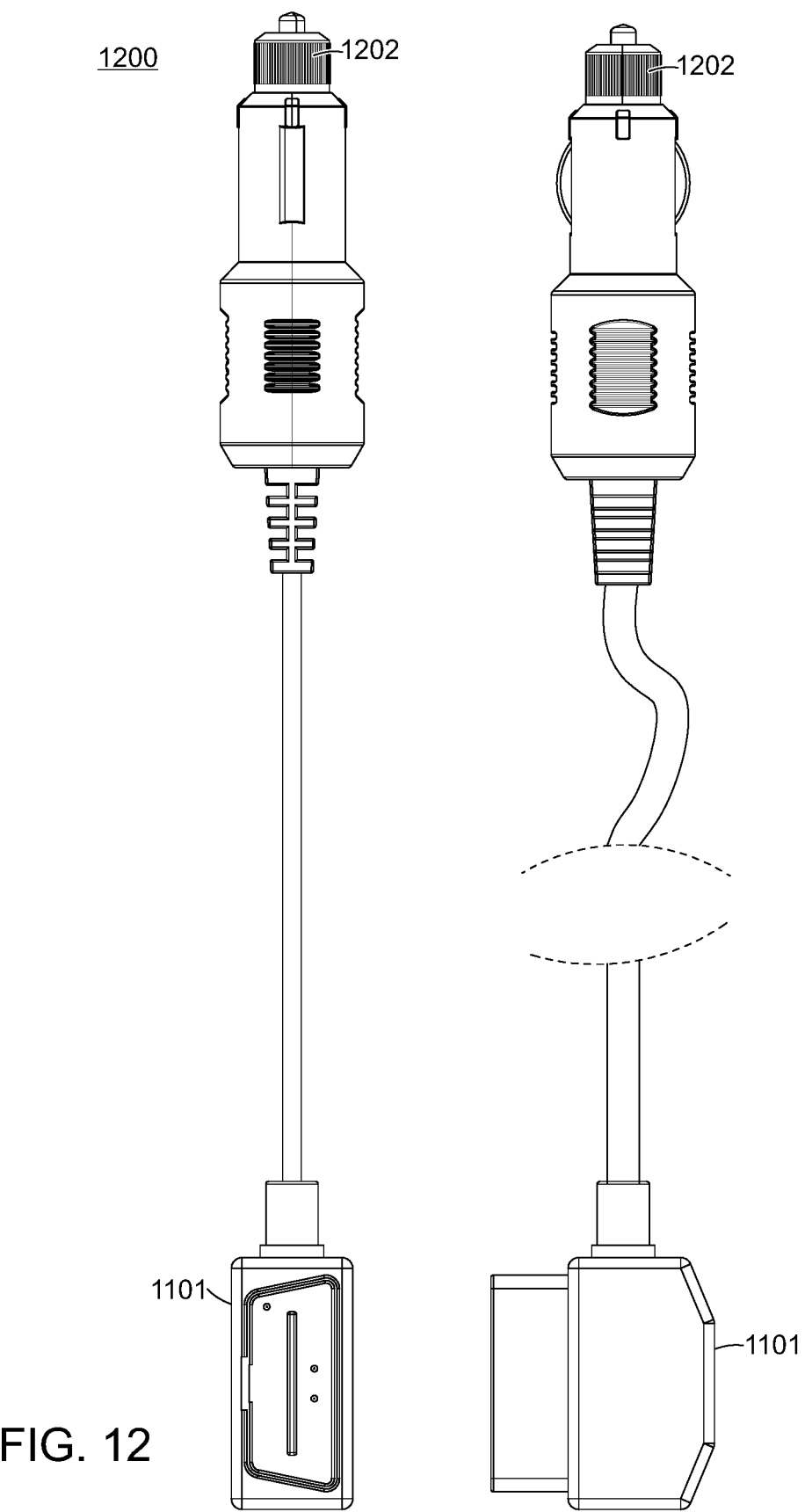

FIGS. 11 and 12 illustrate another exemplary embodiment, where the connector 103 of the charging system 100 can be coupled to a cable. As illustrated in FIG. 11, in this embodiment, the cable 1100 includes a first end and a second end opposite to the first end. The first end includes a mating connector 1101 configured to removably and electrically couple to the connector 103. The second end includes a set of clamps 1102 configured to be removably and electrically coupled to one or more terminals of the vehicle battery 106. In this exemplary embodiment, the set of clamps 1102 are similar to clamps on conventional battery jumper/booster cables. When the connector 103 and the cable 1100 are coupled, the terminals of the vehicle battery 106 is electrically coupled to the charging system 100. The external battery 101 attached to the charging system 100 can then be used to jump start the vehicle 105.

As illustrated in FIG. 12, in an alternative embodiment, the second end of the cable 1200 includes an adapter 1202 configured to be removably and electrically coupled to a cigarette lighter port of the vehicle 106. Charge can then be provided to the vehicle battery 106 through the cigarette lighter port in the manner described above.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the device and their locations, electronic communication methods between the system components, magnet types, cables, wiring, attachment or securement mechanisms, mechanical connections, electrical connections, dimensions, values, materials, charging methods, battery types, applications/uses, tools and devices that can be used therewith, etc. discussed above or shown in the drawing, if any, are merely by way of example and are not considered limiting and other component(s) and their locations, electronic communication methods, magnet types, cables, wiring, attachment or securement mechanisms, mechanical connections, electrical connections, dimensions, values, materials, charging methods, battery types, applications/uses, tools and devices that can be used therewith, etc. can be chosen and used and all are considered within the scope of the disclosure.

The present invention can include a computer readable storage medium providing program code for use by or in connection with a computer or any instruction execution system. For the purposes of this description, a computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, a random access memory (RAM), and a read-only memory (ROM). A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The use of letterings in the claims are for the ease of reference only and do not indicate any required order. The recited elements may occur in any order. For example, two elements recited in succession may, in fact, be executed substantially concurrently, or the elements may sometimes be executed in the reverse order, depending upon the functionality involved.

What is claimed is:

1. A charging system, comprising:
   an interface configured to removably and electrically couple to an external battery;
   a connector configured to removably and electrically couple to an on-board diagnostic (OBD) port of a vehicle;
   charge management circuitry electrically coupled to the interface and the connector; and
   a microcontroller unit (MCU) coupled to the charge management circuitry, the MCU configured to execute computer readable program code for managing an output of current from the external battery to a vehicle battery of the vehicle through the electrical coupling of the connector and the OBD port, wherein when the external battery is electrically coupled to the interface and the connector is electrically coupled to the OBD port, the MCU:
   (a) opens an output switch of the charging system to output the current from the external battery to the connector;
   (b) during the outputting of the current, measures a voltage of the vehicle battery using the electrical coupling of the connector and the OBD port;
   (c) upon determining that the voltage of the vehicle battery has reached a set voltage, closes the output switch to stop the output of the current, enters a low power consumption mode, and starts a low power consumption timer;
   (d) upon the expiration of the low power consumption timer, measures the voltage of the vehicle battery using the electrical coupling of the connector and the OBD port;
   (e) if the voltage of the vehicle battery is above a charge voltage, reenters the low power consumption mode, restarts the low power consumption timer, and repeats the measuring (d); and
   (f) if the voltage of the vehicle battery is below the charge voltage, repeats (a) through (f), wherein in the repeating (f), the MCU further:
      (f1) for every two expirations of the low power consumption timer, increases the set voltage by a preset amount; and
      (f2) repeats (a) through (f) using the increased set voltage.

2. The charging system of claim 1, wherein during the outputting of the current (b), the MCU further:
   (b1) measures a temperature of the external battery using the interface; and
   (b2) if the temperature of the external battery exceeds a temperature threshold, closes the output switch to stop the output of the current and shuts down the charging system.

3. The charging system of claim 1, wherein during the outputting of the current (b), the MCU further:
   (b1) measures a voltage of the external battery using the interface; and
   (b2) if the voltage of the external battery is below a voltage threshold, closes the output switch to stop the output of the current and shuts down the charging system.

4. The charging system of claim 1, wherein prior to opening the output switch, the MCU:
   (g) starts a test timer for a test period;
   (h) prior to an expiration of the test timer,
      (h1) measures a temperature of the external battery using the interface; and
      (h2) if the temperature of the external battery exceeds a temperature threshold, shuts down the charging system;
   (i) prior to the expiration of the test timer,
      (i1) measures a voltage of the external battery using the interface; and
      (i2) if the voltage of the external battery is below a voltage threshold, shuts down the charging system; and
   (j) upon the expiration of the test timer, executes (a) through (f).

5. The charging system of claim 1, further comprising:
   a cable with a first end and a second end,
   wherein the first end is configured to be removably and electrically coupled to the connector,
   wherein the second end comprises a set of clamps configured to be removably and electrically coupled to one or more terminals of the vehicle battery.

6. The charging system of claim 1, further comprising:
   a cable with a first end and a second end, wherein the first end is configured to be removably and electrically coupled to the connector, wherein the second end comprises an adapter configured to be removably and electrically coupled to a cigarette lighter port of the vehicle battery.

7. A charging method, comprising:
(a) outputting, by a microcontroller unit (MCU) of a charging system, a current from an external battery to a connector of the charging system, the external battery removably and electrically coupled to the charging system, the connector removably and electrically coupled to an on-board diagnostic (OBD) port of a vehicle, wherein the connector is electrically coupled to a vehicle battery of the vehicle through the OBD port;
(b) during the outputting of the current, measuring, by the MCU, a voltage of the vehicle battery using the electrical coupling of the connector and the OBD port;
(c) upon determining that the voltage of the vehicle battery has reached a set voltage, stopping the output of the current and entering a low power consumption mode for a predetermined period of time by the MCU;
(d) upon the expiration of the predetermined period of time, measuring, by the MCU, the voltage of the vehicle battery using the electrical coupling of the connector and the OBD port;
(e) if the voltage of the vehicle battery is above a charge voltage, reentering the low power consumption mode for the predetermined period of time by the MCU and repeating the measuring (d); and
(f) if the voltage of the vehicle battery is below the charge voltage, repeating the charging method (a) through (f) by the MCU, wherein the repeating (f) comprises:
(f1) for every two expirations of the predetermined period of time, increasing the set voltage by a preset amount by the MCU; and
(f2) repeating the charging method (a) through (f) by the MCU using the increased set voltage.

8. The method of claim 7, wherein during the outputting of the current (b), the method further comprises:
(b1) measuring, by the MCU, a temperature of the external battery; and
(b2) if the temperature of the external battery exceeds a temperature threshold, stopping the output of the current and shutting down the charging system by the MCU.

9. The method of claim 7, wherein during the outputting of the current (b), the method further comprises:
(b1) measuring, by the MCU, a voltage of the external battery; and
(b2) if the voltage of the external battery is below a voltage threshold, stopping the output of the current and shutting down the charging system by the MCU.

10. The method of claim 7, wherein prior to outputting the current, the method comprises:
(g) starting, by the MCU, a test timer for a test period;
(h) prior to an expiration of the test timer,
(h1) measuring, by the MCU, a temperature of the external battery; and
(h2) if the temperature of the external battery exceeds a temperature threshold, shutting down the charging system by the MCU;
(i) prior to the expiration of the test timer,
(i1) measuring, by the MCU, a voltage of the external battery; and
(i2) if the voltage of the external battery is below a voltage threshold, shutting down the charging system by the MCU; and
(j) upon the expiration of the test timer, proceeding to the charging method (a) through (f) by the MCU.

11. A non-transitory computer readable medium comprising computer readable program code embodied therein, wherein when executed by a microcontroller unit (MCU) causes the MCU to:
(a) output a current from an external battery to a connector of a charging system, the external battery removably and electrically coupled to the charging system, the connector removably and electrically coupled to an on-board diagnostic (OBD) port of a vehicle, wherein the connector is electrically coupled to a vehicle battery of the vehicle through the OBD port;
(b) during the outputting of the current, measure a voltage of the vehicle battery using the electrical coupling of the connector and the OBD port;
(c) upon determining that the voltage of the vehicle battery has reached a set voltage, stop the output of the current and enter a low power consumption mode for a predetermined period of time;
(d) upon the expiration of the predetermined period of time, measure the voltage of the vehicle battery using the electrical coupling of the connector and the OBD port;
(e) if the voltage of the vehicle battery is above a charge voltage, reenter the low power consumption mode for the predetermined period of time and repeat the measuring (d); and
(f) if the voltage of the vehicle battery is below the charge voltage, repeat (a) through (f), wherein the repeat (f) comprises:
(f1) for every two expirations of the predetermined period of time, increase the set voltage by a preset amount; and
(f2) repeat (a) through (f) using the increased set voltage.

12. The medium of claim 11, wherein during the output of the current (b), the MCU is further caused to:
(b1) measure a temperature of the external battery; and
(b2) if the temperature of the external battery exceeds a temperature threshold, stop the output of the current and shut down the charging system.

13. The medium of claim 11, wherein during the output of the current (b), the MCU is further caused to:
(b1) measure a voltage of the external battery; and
(b2) if the voltage of the external battery is below a voltage threshold, stop the output of the current and shut down the charging system.

14. The medium of claim 11, wherein prior to outputting the current, the MCU is further caused to:
(g) start a test timer for a test period;
(h) prior to an expiration of the test timer,
(h1) measure a temperature of the external battery; and
(h2) if the temperature of the external battery exceeds a temperature threshold, shut down the charging system;
(i) prior to the expiration of the test timer,
(i1) measure a voltage of the external battery; and
(i2) if the voltage of the external battery is below a voltage threshold, shut down the charging system; and
(j) upon the expiration of the test timer, proceed to (a) through (f).

* * * * *